(12) United States Patent
Whitham

(10) Patent No.: US 8,644,700 B2
(45) Date of Patent: Feb. 4, 2014

(54) DIGITAL CAMERA WITH HIGH DYNAMIC RANGE MODE OF OPERATION

(71) Applicant: Charles L. Whitham, Reston, VA (US)

(72) Inventor: Charles L. Whitham, Reston, VA (US)

( * ) Notice: Subject to any disclaimer, the term of this patent is extended or adjusted under 35 U.S.C. 154(b) by 0 days.

(21) Appl. No.: 13/875,708

(22) Filed: May 2, 2013

(65) Prior Publication Data

US 2013/0242177 A1    Sep. 19, 2013

Related U.S. Application Data

(63) Continuation of application No. 12/392,393, filed on Feb. 25, 2009.

(60) Provisional application No. 61/042,444, filed on Apr. 4, 2008.

(51) Int. Cl.
*G03B 7/00* (2006.01)

(52) U.S. Cl.
USPC .......................................................... 396/222

(58) Field of Classification Search
USPC ............................................ 396/222; 348/362
See application file for complete search history.

(56) References Cited

U.S. PATENT DOCUMENTS

| 4,959,680 | A | * | 9/1990 | Ishida et al. | ................. 396/63 |
| 5,333,027 | A | * | 7/1994 | Matsushima | ............... 396/130 |
| 5,828,793 | A | | 10/1998 | Mann | |
| 6,427,052 | B1 | * | 7/2002 | Ogi et al. | ..................... 396/222 |

* cited by examiner

*Primary Examiner* — Clayton E Laballe
*Assistant Examiner* — Noam Reisner
(74) *Attorney, Agent, or Firm* — Whitham, Curtis, Christofferson & Cook, P.C.

(57) ABSTRACT

A digital camera is provided with a high dynamic range (HDR) mode of operation wherein a nominal exposure is automatically bracketed by one or more under exposures and one or more overexposures. The images thus obtained can then be used by suitable software to process the images to produce a final HDR image.

2 Claims, 5 Drawing Sheets

DIGITAL CAMERA WITH HIGH DYNAMIC RANGE MODE OF OPERATION

CROSS-REFERENCE TO RELATED APPLICATION

This application claims priority to provisional patent application No. 61/042,444 filed Apr. 4, 2008, the disclosure of which is incorporated herein by reference.

DESCRIPTION

Background of the Invention

1. Field of the Invention

The present invention generally relates to digital photography and, more particularly, to a digital camera with high dynamic range mode of operation.

2. Background Description

High dynamic range (HDR) photography is becoming more popular because it permits the photographer to capture a greater range of tonal detail than the camera is capable of capturing in a single photograph. Sensors for digital cameras have become higher resolution with each new generation of sensor. The increased number of pixels correspondingly means a decrease in the size of the individual pixels for a given sensor size. Unfortunately, the higher resolution of the sensors is often not accompanied by an increase in the luminance range of the sensors. For example, in a landscape where the sky is bright but the foreground is only moderately bright, the photographer must make a determination as to whether the photograph should be properly exposed for the sky, making the foreground quite dark, or properly exposed for the foreground, blowing out all the detail of the sky. One solution has been to use a neutral density gradient filter attached to the lens which, in effect, lowers the exposure of the sky when the foreground is properly exposed. However, this well known approach is limited, and that is the reason for the current interest in HDR photography which, up until recently, had been primarily used in computer generated imagery.

The technique requires the photographer to provide a stable platform for the camera, i.e., a tripod, and take a series of exposures of the same scene, typically three or five exposures, at different exposure values (EVs). It is important that the camera not be moved between the successive exposures since the computer software that will merge the series of photographs requires that the images be aligned. Some of the available computer software provide a limited alignment function to account for any misregistration between images. The computer software maps luminance values at each corresponding pixel of the several images. Examples of current computer software that provides HDR merging of images are Photomatix and Photoshop CS3 and CS4.

SUMMARY OF THE INVENTION

It is an object of the present invention to provide a digital camera with, a high dynamic range mode of operation to facilitate generating the images needed to produce HDR images and photographs.

There is provided digital camera having an automatic, continuous shutter function and an exposure bracketing function. The camera includes a user interface, typically in the form of an LCD screen and a navigation button, which allows the user to select such things a white balance, ISO value, picture quality, and the like. This user interface also allows the user to select various modes of operation. According to the invention, a high dynamic range (HDR) mode of operation is provided which the user can select. In a preferred embodiment, the user is able to select between a plurality of HDR modes, depending on the number of images to be captured when operated in an HDR mode. Once the HDR mode of operation is selected, when the user depresses the shutter release half way, causing the camera to perform automatic focus and exposure metering, the exposure value measured by the camera is temporarily stored as the nominal exposure. In other words, this nominal exposure value (EV) is the exposure the camera would use when inking a single image in normal mode, single frame of operation. However, this nominal exposure is automatically bracketed in the selected HDR mode. That is, predetermined exposure values above and below the nominal EV are determined by the camera when in HDR mode. Now depending on the exposure mode selected by the user, e.g., automatic, aperture priority, or shutter priority, the bracketed exposure values may have varying aperture and shutter settings (automatic mode), varying shutter speeds (aperture priority mode), or varying apertures (shutter priority mode). However, in the preferred embodiment of the invention, when HDR mode is selected, the user selected exposure mode is overridden to be aperture priority while in HDR mode. This is to ensure that the depth of field (DoF) of each, exposure remains constant. If the particular HDR mode selected requires three exposures, then the bracketing on either side of the nominal EV is some predetermined EV for exposures above and below the nominal EV. If the HDR mode selected requires five exposures, then bracketing on either side of the nominal EV is two, typically evenly spaced, exposure values on either side of the nominal EV. Note here that when the camera is in aperture priority mode, the bracketing EVs are accomplished by varying the shutter speeds. Now, when the user fully depresses the shutter release, the camera takes in continuous succession the number of programmed exposures for the HDR mode selected.

In addition to overriding a user selected exposure mode to be aperture priority mode when an HDR mode is selected, in the ease of auto focus lenses, the focus is fixed during the successive exposures. As mentioned, when the shutter release is pressed half way, the camera performs automatic focus and exposure metering. It is important that lens focus remain constant for each of the successive exposures. This is accomplished in manual HDR exposures by manually switching the lens to manual focus after first acquiring focus in the autofocus function. The purpose of the present invention is to avoid the many manual steps that have been required in taking multiple exposures for HDR photography; therefore, according to the invention, when the shutter release is fully depressed, the autofocus function of the camera lens is disabled during the continuous sequence of exposures.

In an alternative embodiment of the digital camera according to the invention, the shutter priority mode may be selected. The selected shutter speed would be sufficiently fast to allow for hand holding the camera. This combined with, for example, vibration reduction (VR) of certain Nikon lenses or image stabilisation (IS) of certain Canon Senses, or other vibration reduction and image stabilization mechanisms of other lens manufacturers, should produce reasonably well aligned images since the exposures would be made sufficiently fast to maintain proper alignment. Any variation in DoF can be compensated for in computer processing of the images. While not the preferred embodiment, this embodiment might be used to enable hand held operation.

In yet another alternative embodiment of the invention, instead of bracketing EVs on either side of a nominal EV, a first exposure can be determined as an exposure where the highlights are just being blown out, i.e., the image is over exposed. Bracketing would then take the form of multiple exposures, each of which are successively reduced in EV. The number of such exposures can be predetermined in the camera or the user can be given the option to preset the number of exposures.

In its simplest form, the camera would have a single HDR mode, selectable by the user. In this mode, the camera would select an EV having a sufficiency high shutter speed to allow for hand holding exposures for the lowest bracketed EV. The camera would then operate in aperture priority mode, taking at least three exposures at different shorter speeds in continuous shutter operation, yielding three exposures with successively different EVs.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
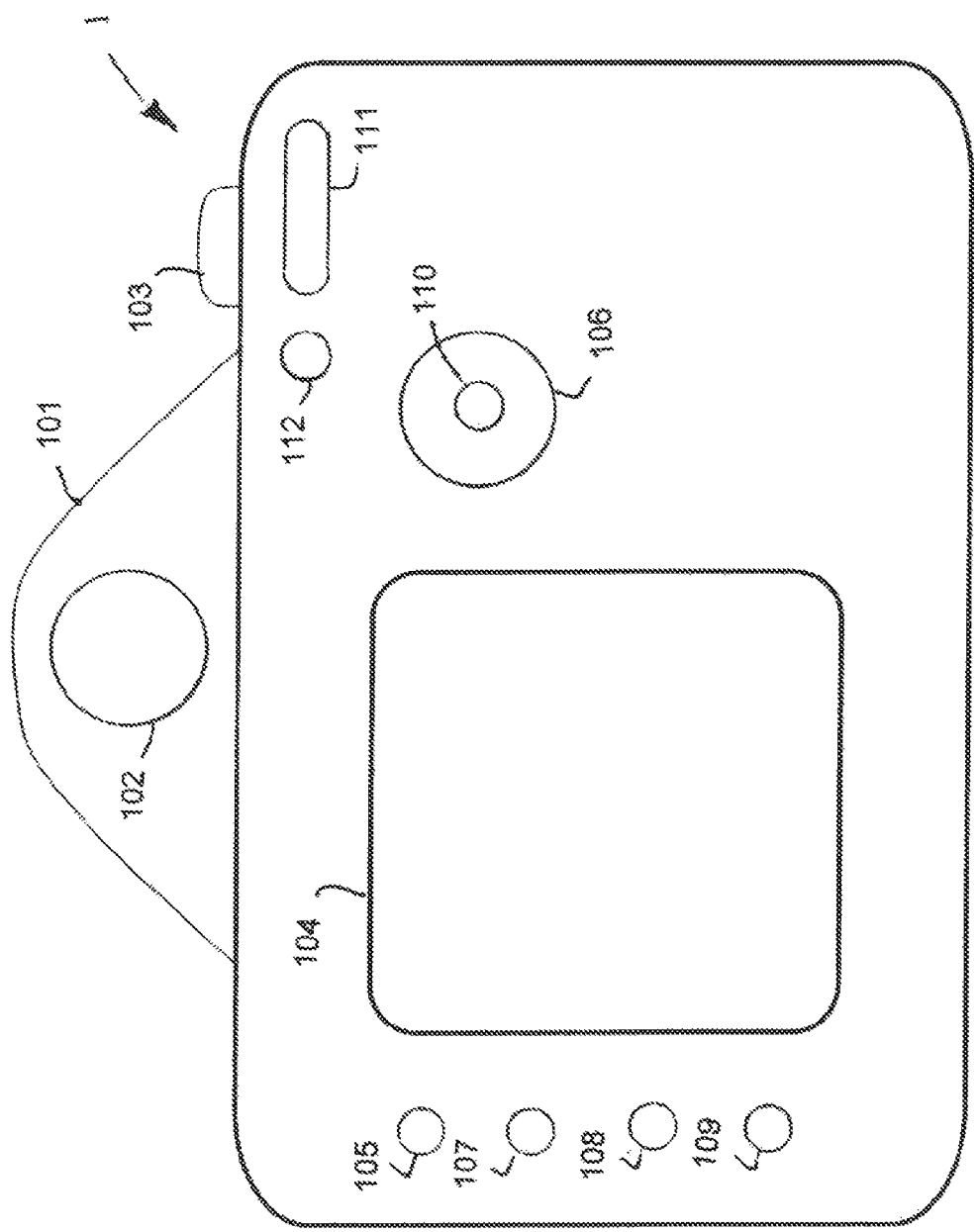
FIG. 1 is a simplified diagrammatic rear view of a digital single lens reflex (DSLR) camera of the type in which the invention can be implemented.

Referring now to the drawings, and more particularly to FIG. 1, there is shown a rear view (i.e., the photographer's side) of a typical DSLR camera 1. The camera is configured with a pentaprism view finder 101 having an eyepiece 102 which allows the photographer to view a scene to be photographed through the lens (not shown) attached to the front of the camera. Once the photographer has framed the scene, the photograph is taken by pressing the shutter release button 103. In most modern DSLR cameras, pressing halfway down on the shutter release button causes the lens to be automatically focused, allowing the photographer to control the point of focus. The exposure can be set by the photographer to be, for example, automatic, aperture priority, shutter priority, or manual. Other programmed modes may also be available, depending on the particular DSLR camera. When the picture is taken, an image of the picture is provided in the liquid crystal display (LCD) 104 on the back of the camera. The displayed image is only displayed for a short period of time to minimize battery drain, but if the photographer wants to display a recently taken picture, a button 105 adjacent to the LCD 104 may be pressed to temporarily display the most recently taken picture. If the photographer wants to review of a series of pictures, a cursor button 106 is provided which, when pressed on the right side, advances through a series of pictures and which, when pressed on the left side, reverses the sequence of displayed pictures.

The LCD 104 is also used to display various menus which allow the photographer to setup up the camera for various conditions and desired output. For example, the photographer can select various ISO (International Organization for Standardization) setting, white balance, and resolution of the picture, among other things, using the menus displayed on the LCD 104. To this end, there are provided a series of additional buttons 107, 108 and 109 adjacent the LCD 104. One of these buttons, say button 107, may be designated the "Menu" button. When this button is pressed, a menu screen is displayed on the LCD. The photographer can navigate through the menu and display additional menus by operating the cursor button 106. More specifically, the photographer can move up and down through various menu entries by pressing the top and bottom of the cursor button 106 and can move left and right through various menu entries by pressing the left and right sides of the cursor button. Inside the cursor button 106 is a concentric button 110 which, when pressed, makes a selection of a particular menu entry the photographer has highlighted with the cursor button.

In addition to using the menus displayed in the LCD, the photographer is typically provided with shortcut buttons and thumb wheels that allow the photographer to quickly make selections and changes without having to access the menus. So, for example, a thumb wheel 111 is provided for the photographer to operate in combination with a selected button or switch to change a setting, such as ISO, white balance, exposure mode, or the like. The typical DSLR camera is provided with a switch (hot shown) which is often located on the front of the camera for selecting between single frame (S) or continuous frame (C) exposure. In S exposure mode, pressing the shutter release button 103 causes a single exposure to be made, whereas in C exposure mode, multiple exposures are made as long as the shutter release button is depressed. Also, the typical DSLR camera provides the photographer with the option of bracketing exposures of a scene, and this is accomplished manually by pressing a button 112.

Figure 2:
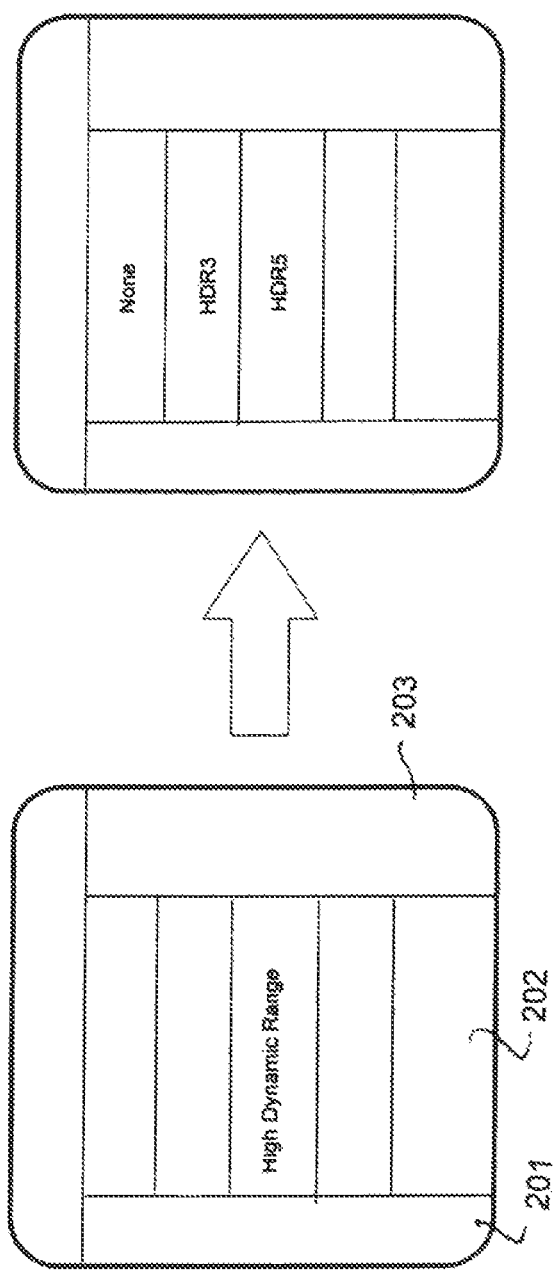
FIG. 2 is an illustration of menu selections that may be made to implement the HDR mode in the DSLR camera.

In the practice of this invention, the user interface forfeiting the HDR mode utilizes one or more of the controls described above. The first of these, using the menus, is illustrated in FIG. 2. These menus are divided into a tab section 201, a menu option section 202 and a current setting section 203. Navigation up and down the tab section 201 and the menu options sections 102 is by pressing the top and bottom of the cursor 106, and navigation between the several sections is by pressing the right and left sides of the cursor button 106. A setting for a menu option is selected by pressing the button 110.

The first menu 21, according to the present invention, shows one of the menu options to be HDR, or high dynamic range. However, the corresponding current setting is blank, indicating that the HDR mode is not selected. In one embodiment of the invention, by making a menu option selection, the photographer causes the second menu 22 to be displayed. Here the photographer is presented with three options in the example illustrated. These are "None", "HDR3" and "HDR5", the option "None" is self-explanatory. The option "HDR3" means that three exposures will be made, one under exposed, one nominally exposed as metered, and one overexposed. Likewise, the option "HDR5" means that five exposures will be made, two at different levels of underexposure, one nominally exposed, and two at different levels of overexposure. These are only examples and different numbers of exposures may be chosen in the practice of the invention, but three and five exposures represent the most practical application of the invention in this embodiment. In addition, the amounts of underexposure and overexposure may be selectable by the photographer. For example, in shutter priority mode, the underexposure and overexposure may be selected to be a full f/stop or fraction thereof. Correspondingly, in aperture priority mode, the different shutter speeds may be selected to accomplish underexposure and overexposure.

Alternatively and in addition to the menu selection method, the photographer may select HDR mode of operation by simultaneously selecting continuous (C) frame exposure and pressing the bracketing button 112. Then by using the thumb wheel 111, the photographer may select between HDR3 and HDR5 modes.

Figure 3:
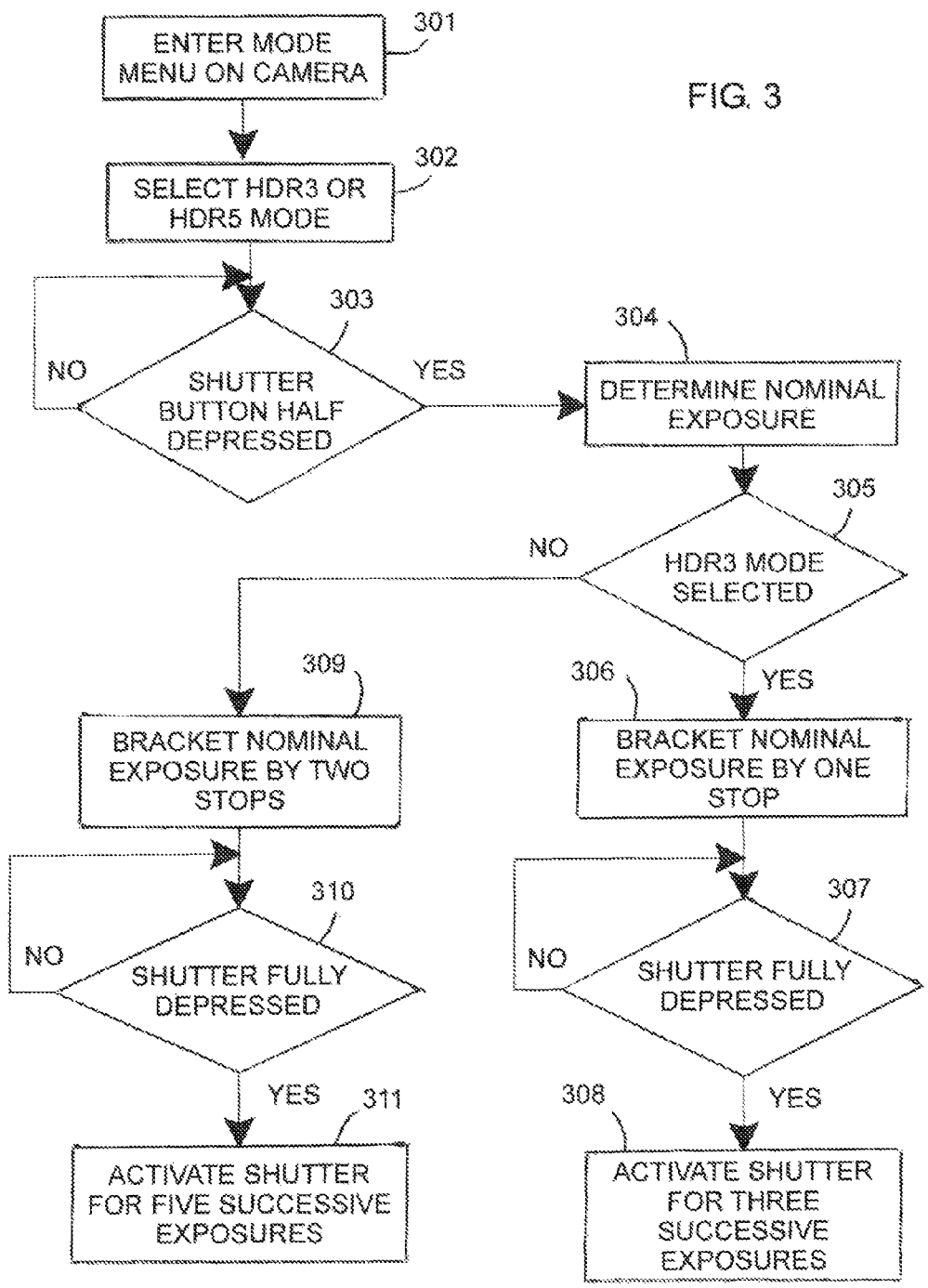
FIG. 3 is a flow diagram of the firmware in the DSLR camera implementing the HDR mode of operation according to a preferred embodiment of the invention.

FIG. 3 is a flow diagram which illustrates the logic implemented in the firmware of the camera in the practice of the invention according to the first preferred embodiment. The process begins in function block 301 where the photographer enters the mode menu on the camera and, in function block 302, selects one of HDR3 or HDR5 modes. See FIG. 2. As just explained, the photographer can also access and select one of the HDR3 or HDR5 modes using the short cut of operating switches and the thumb wheel. The two are entirely equivalent. Next, a determination is made in decision block 303 as to whether the shutter is half depressed. Remember, this operation causes the camera to automatically focus on a desired point in the image. At the same time, the metered light is used to determine the nominal exposure in function block 304. A determination is made in decision block 305 as to whether the HDR3 mode is selected. If so, the bracketing function determines the amount of underexposure and the amount of overexposure in function block 306. A determination is made in decision block 307 as to whether the shutter release button has been fully depressed. If so, the shutter is automatically activated for three successive exposures, one underexposed, one nominally exposed and one overexposed, as indicated by function block 308. During this process, the autofocus function of the lens is disabled. Returning to decision block 305, if the HDR3 mode is not selected, then the HDR5 mode is selected. The bracketing function determines the amount of two different underexposures and the amount of two different over exposures in function block 309. A determination is made in decision block 310 as to whether the shutter release button has been fully depressed. If so, the shutter is automatically activated for five successive exposures, two different underexposures, one nominally exposure and two different over exposures, as indicated by function block 311. Again, during this process, the autofocus function of the lens is disabled.

As previously mentioned the under and over exposures may be accomplished in aperture priority mode, shutter priority mode or automatic exposure mode. The first mode, aperture priority, would be selected to maintain a desired depth of field (DoF). The second mode, shutter priority, would be selected to ensure that pictures are taken with the least amount of shake in hand held operation. The third mode, automatic exposure mode, would allow the camera to determine the combinations of shutter speeds and aperture openings on the basis of computed exposure values (EVs). The second mode, shutter priority, provides a certain advantage in the practice of the invention since, by using this mode, the need for a tripod or other highly stable platform can be eliminated, but this can result in slightly different depths of field for each exposure. In many cases this can be compensated in computer processing software of the HDR images. Generally, the best approach to HDR photography is to operate In aperture priority mode to maintain a constant DoF in each exposure.

Figure 4:
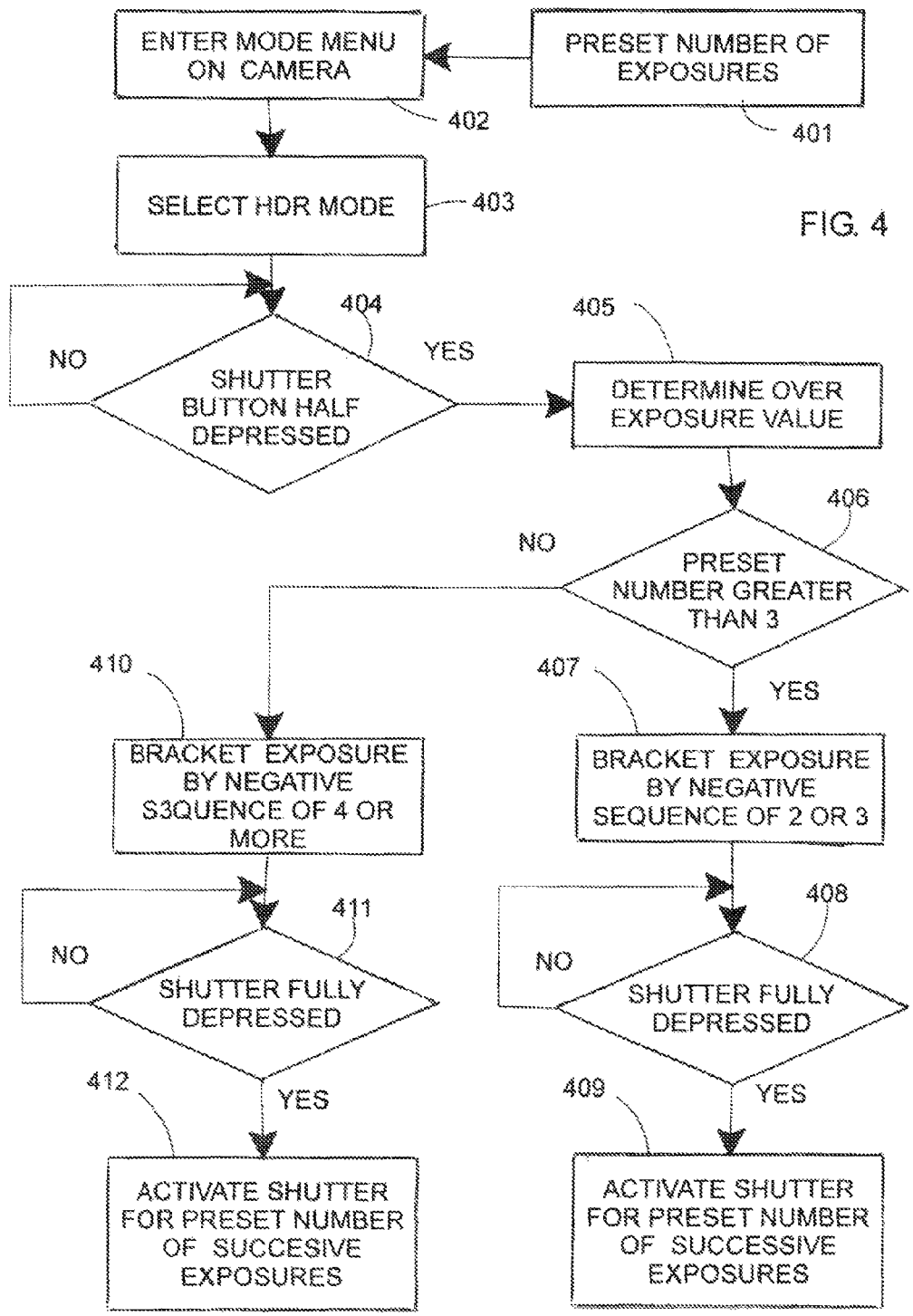
FIG. 4 is a flow diagram of the firmware in the DSLR camera implementing the HDR mode of operation according to another preferred embodiment of the invention.

In yet another alternative embodiment of the invention, instead of bracketing EVs on either side of a nominal EV, a first exposure can be determined as an exposure where the highlights are just being blown out, i.e., the image is overexposed. Bracketing would then take the form of multiple exposures, each of which are successively reduced in EV. The number of such exposures can be predetermined in the camera or the user can be given the option to preset the number of exposures. This is illustrated in FIG. 4 where, in the illustrated example, the user would preset the number of exposures for HDR mode in advance in function block 401. With the number of exposures preset by the user, the HDR process begins in function block 402 when the user enters the mode menu on the camera. The user then selects the HDR mode in function block 403. A determination is made in decision block 404 as to whether the shutter button has been depressed half way. This is the indication that automatic exposure and focus is to be made. In function block 405, the camera determines an exposure value which is just slightly over exposed. A determination is made in decision block 406 as to whether the preset number of exposures is greater than three. If so, the exposure is bracketed by a negative sequence of predetermined EVs or fractions thereof (i.e., increasing shutter speeds) in function block 407. When the shutter button is fully depressed, as determined in decision block 408, the shutter is automatically activated in function block 409 for the preset number of successive exposures, each exposure being at a lower EV by a predetermined stop or fraction thereof. During this process, the autofocus function of the lens is disabled.

Returning to decision block 406, if the present number of exposures is greater than 3, the exposure is bracketed by a negative sequence of predetermined stops or fractions thereof in function block 410. When the shutter button is fully depressed, as determined indecision block 411, the shutter is automatically activated in function block 412 for the preset number of successive exposures, each exposure being at a lower EV by negative sequence of predetermined EVs or fractions of EVs (i.e., a sequence of faster shutter speeds). Again, during this process, the autofocus function of the lens is disabled.

It will be appreciated by those skilled in the art that the examples given in FIGS. 3 and 4 can be modified. For example, while both of these embodiments change the EV by a negative sequence of predetermined stops or fractions of stops for a number of exposures less than or equal to three and by a negative sequence of predetermined EVs or fractions of an EV for a number of exposures greater than three, the EVs for each exposure can be different for each of these two specific examples. For example, a half or other fractional EV could be implemented for exposures greater than three. Likewise, less than two EVs could be implemented for less than or equal to three.

Additionally, the embodiments illustrated in FIGS. 3 and 4 could be further modified so that, when entering the HDR mode, aperture priority mode is automatically selected, overriding any prior selection by the user. As is well understood by those skilled in the art, having a selected aperture and bracketing EVs by changing shutter speeds insures a constant DoF for each exposure. This embodiment, however, may require that HDR mode be best operated when the camera is mounted on a tripod.

Figure 5:
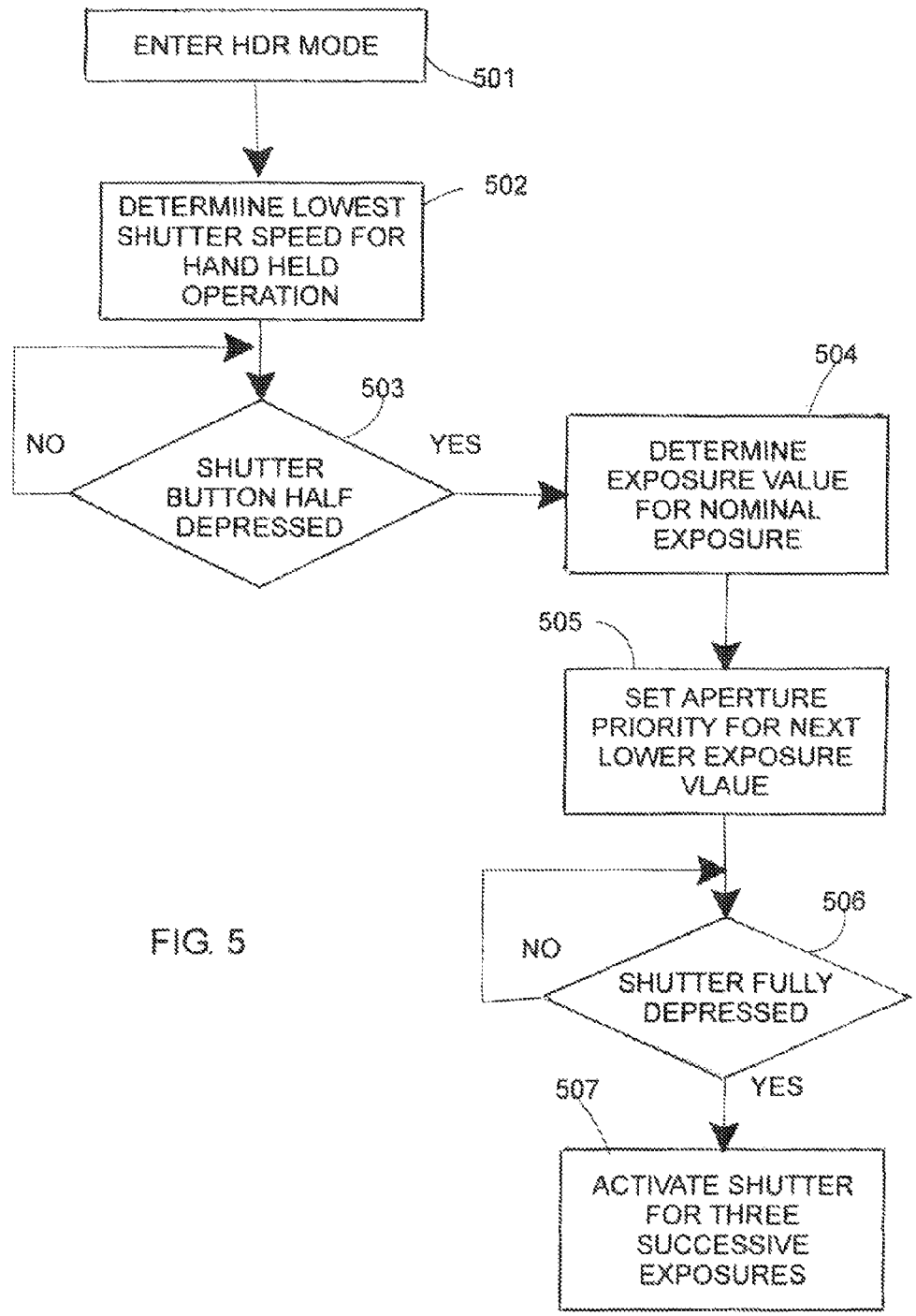
FIG. 5 is a flow diagram of the firmware in the DSLR camera implementing a simplified HDR mode of operation according to yet another preferred embodiment of the invention.

In its simplest form, the camera would have a single HDR mode selectable by the user. In this mode, the camera would select an EV having a sufficiently high shutter speed to allow for hand holding exposures for the lowest bracketed EV. The camera would then operate in aperture priority mode, taking at least three exposures at different shutter speeds in continuous automatic shutter operation, yielding three exposures with successively different EVs. This embodiment is illustrated in FIG. 5. The process begins by entering the HDR mode in function block 501. In function block 502, a determination is made of the lowest shutter speed for hand held operation. This is typically a function of the focal length of the attached lens and may vary as a result of operating the zoom feature of a zoom lens. Generally, the slowest shutter speed for hand held operation is recommended to be the reciprocal of the focal length of the attached lens. So, for example, a shutter speed of 1/60 sec. is recommended for lenses of focal lengths 50 to 55 mm. This may vary if the lens is equipped for vibration reduction (VR) or image stabilisation (IS) or similar technology which would allow a slower shutter speed. The camera is set to aperture priority mode in function block 303 based on the lowest shutter speed determined in function block 502. This will ensure that when the under exposed image is taken, it will be at a shutter speed that was determined in function block 502. A determination is made in decision block 504 as to whether the shutter button is half depressed. If so, the exposure value for a nominal exposure is determined. Then, in function block 505, the nominal exposure value is bracketed by predetermined EV settings. A determination is made in decision block 506 as to whether the shutter button is fully depressed. If so, the shutter is automatically activated for three successive exposures in aperture priority mode. Again, it will be appreciated by those skilled in the art that the embodiment illustrated in FIG. 5 can be modified by implementing, for example, a different number of successive exposures at different EVs. For hand held operation, as a practical matter, three successive exposures appears to be an optimum number, given the speeds at which the shutter can be operated in continuous mode.

While the invention has been described in terms of preferred, embodiments, those skilled in the art will recognize that the invention can be practiced with modification within the spirit and scope of the appended claims.

Having thus described my invention, what I claim as new and desire to secure by Letters Patent is as follows:

1. A computer implemented method performed by a controller in a digital camera, the digital camera comprising a shutter mechanism, a lens, the camera and lens implementing an autofocus function and an exposure metering function under the control of said controller, the controller implementing a plurality of modes of operation of the digital camera selectable by a user, one of said modes of operation being a high dynamic range (HDR) mode of operation, wherein when the HDR mode of operation is selected by the user, the controller performing the following steps of operation:

acquiring focus on a subject of a scene to be photographed using said autofocus function and thereafter disabling the autofocus function;

determining an exposure where highlights are just being blown out;

computing bracketing of the exposure where highlights are just being blown out, said bracketing being by a plurality of under exposures of a scene to be photographed;

setting the camera to aperture priority mode of operation, over riding any other mode of operation previously selected by the user, prior to selecting the HDR mode of operation by the user;

upon a single shutter activation by the user, making in continuous succession the exposure where highlights are just being blown out and the plurality of under exposures of the scene; and reenabling the autofocus function in preparation for subsequent exposure or exposures, whereby the user is able to capture a set of HDR combinable images using only one selection operation by the user followed by actuation of a single shutter activation, the images thus obtained being combinable to produce a final HDR image.

2. A computer implemented method performed by a controller in a digital camera, the digital camera comprising a shutter mechanism, a lens, the camera and lens implementing an autofocus function and an exposure metering function under the control of said controller, the controller implementing a plurality of modes of operation of the digital camera selectable by a user, one of said modes of operation being a high dynamic range (HDR) mode of operation, wherein when the HDR mode of operation is selected by the user, the controller performing the following steps of operation:

acquiring focus on a subject of a scene to be photographed using said autofocus function and thereafter disabling the autofocus function;

determining an exposure where highlights are just being blown out;

computing bracketing of the exposure where highlights are just being blown out, said bracketing being by a plurality of successive exposures of a scene to be photographed, each exposure being at a lower exposure value (EV) by a predetermined stop or fraction thereof;

setting the camera to aperture priority mode of operation, over riding any other mode of operation previously selected by the user, prior to selecting the HDR mode of operation by the user;

upon a single shutter activation by the user, making in continuous succession the exposure where highlights are just being blown out and the plurality of successive exposures at lower EVs of the scene; and reenabling the autofocus function in preparation for subsequent exposure or exposures, whereby the user is able to capture a set of HDR combinable images using only one selection operation by the user followed by actuation of a single shutter activation, the images thus obtained being combinable to produce a final HDR image.

* * * * *